R. E. HALL.
AUTOMATIC GARAGE TURN TABLE.
APPLICATION FILED JULY 15, 1912.
1,050,647.
Patented Jan. 14, 1913.
4 SHEETS—SHEET 2.
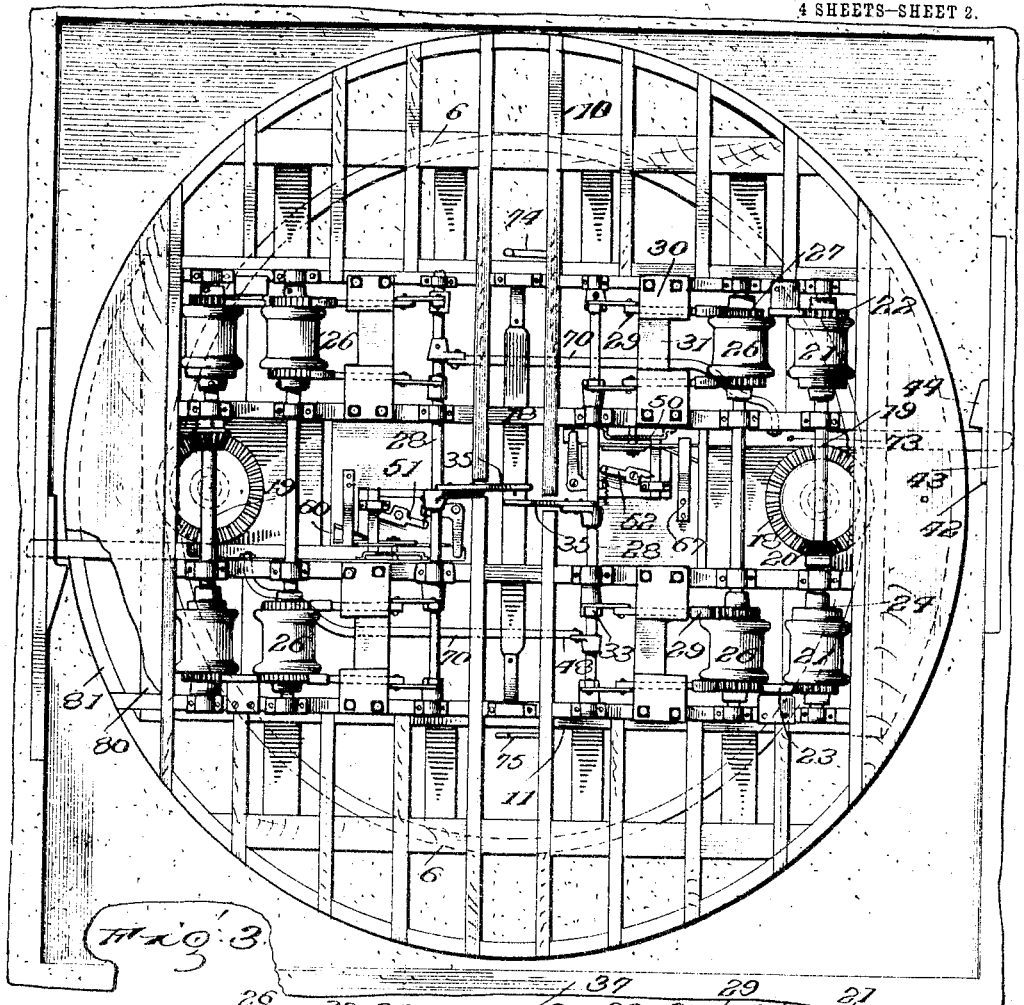
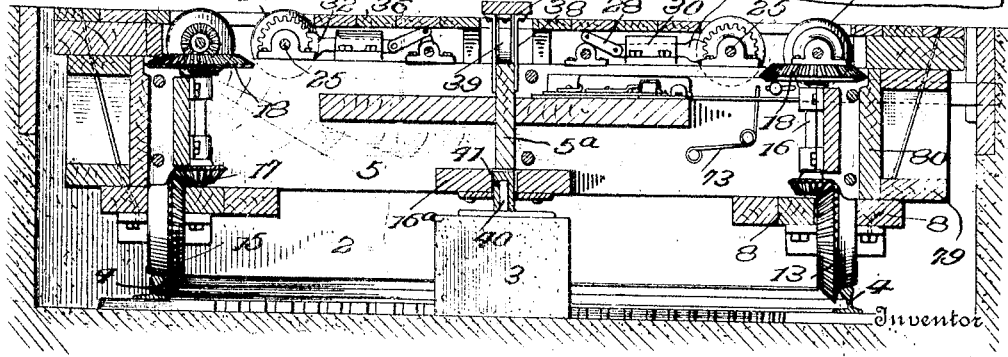

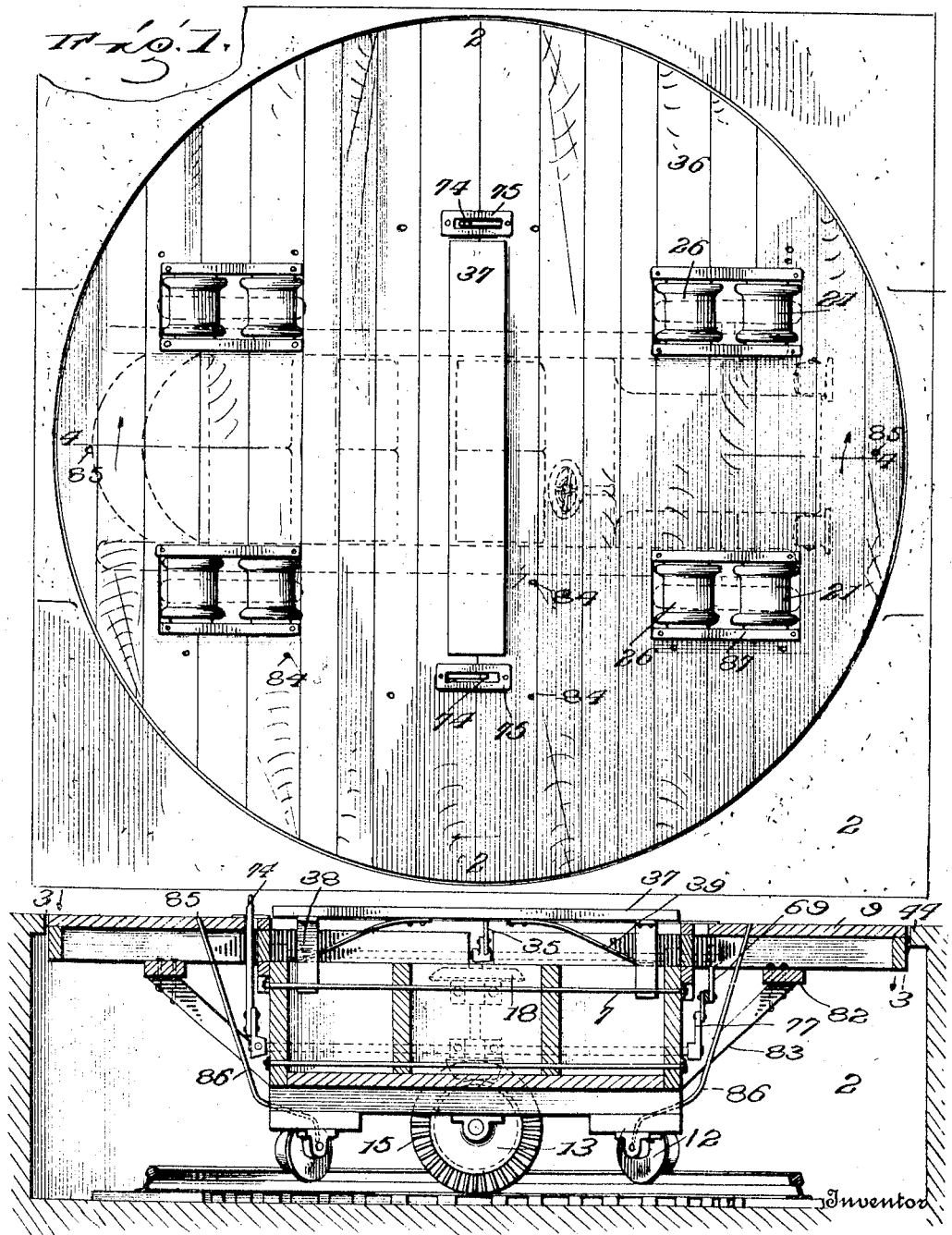

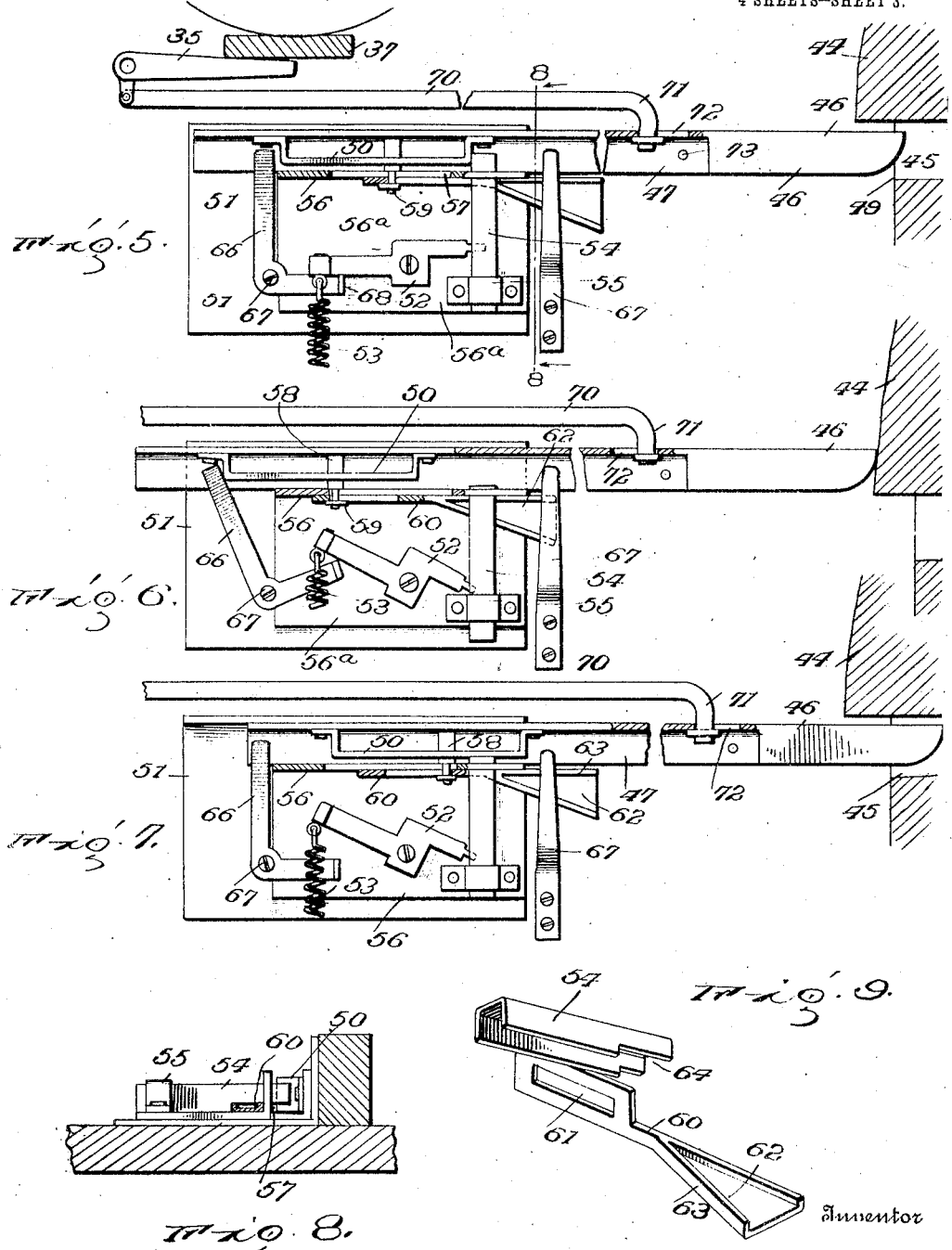

R. E. HALL.
AUTOMATIC GARAGE TURN TABLE.
APPLICATION FILED JULY 15, 1912.
1,050,647.
Patented Jan. 14, 1913.
4 SHEETS—SHEET 4.
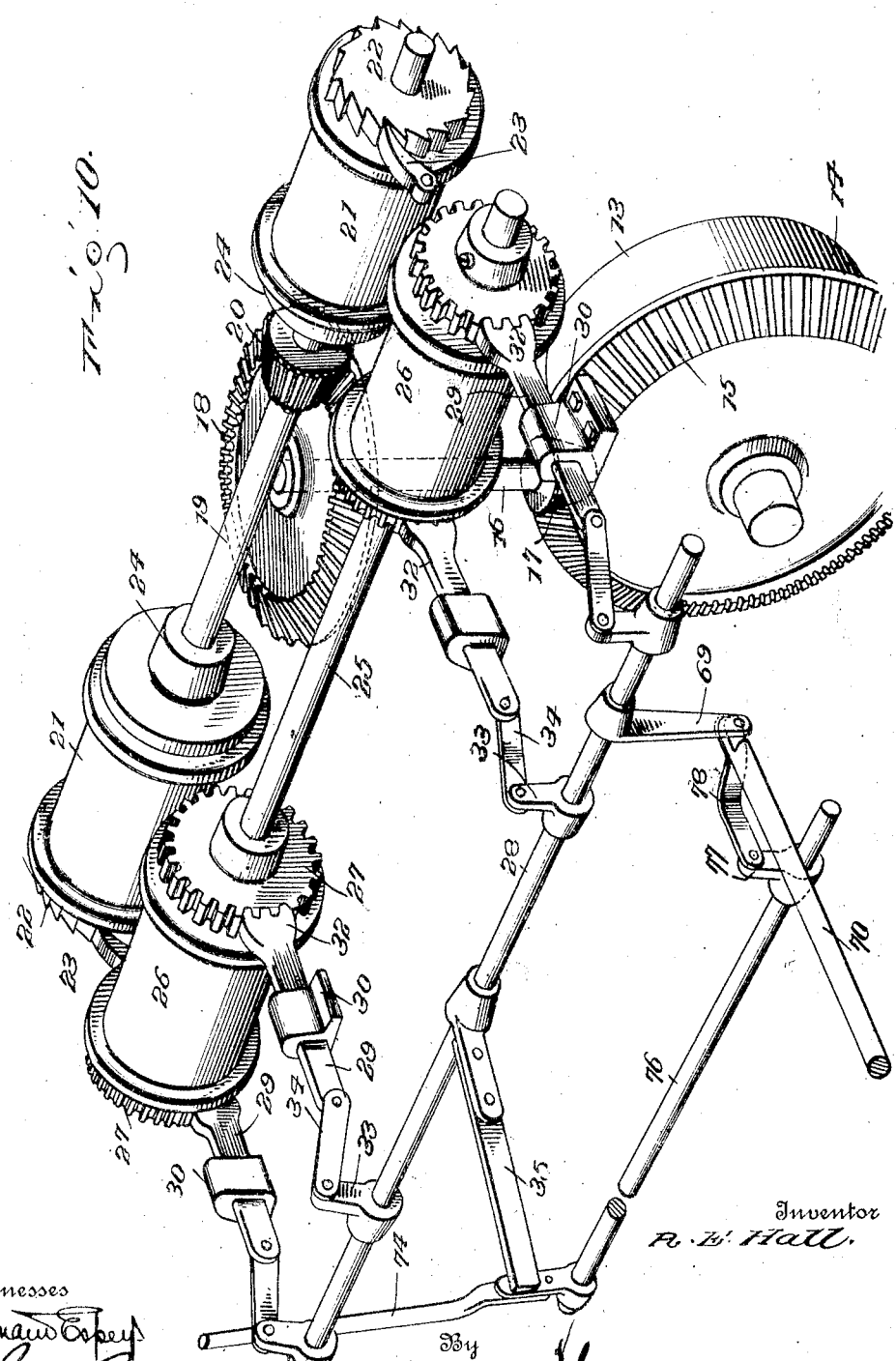

UNITED STATES PATENT OFFICE.

ROBERT EWING HALL, OF CORVALLIS, OREGON.

AUTOMATIC GARAGE TURN-TABLE.

1,050,647.

Specification of Letters Patent. Patented Jan. 14, 1913.

Application filed July 15, 1912. Serial No. 709,560.

*To all whom it may concern:*

Be it known that I, ROBERT EWING HALL, citizen of the United States, residing at Corvallis, in the county of Benton and State of Oregon, have invented certain new and useful Improvements in Automatic Garage Turn-Tables, of which the following is a specification.

My invention relates to turn tables and to a turn table particularly adapted for use in garages or other establishments housing vehicles operated by their own power.

One object of my invention is the provision of a turn table which is rotated by power applied from the vehicle itself.

A further object is to provide a turn table which is automatically locked from rotation under normal conditions, the locking devices, however, being released when a vehicle is run upon the turn table.

A further object is to provide means for holding the locking devices out of operation until the turn table is rotated to a predetermined position, the turn table during this period being freely movable to any desired position between the points at which it is locked.

A further object is to provide means for blocking the vehicle on the turn table while the turn table is being moved, thus preventing the vehicle being accidentally run off of the turn table, and in this connection to provide means for automatically releasing the blocking means when the turn table has reached a predetermined position to permit the vehicle to be run off.

A further object is to provide in connection with a turn table, driving wheels and rollers with which the wheels of an automobile or like vehicle will engage whereby the turn table may be rotated through the power of the vehicle itself, and to provide in connection with these driving wheels idler wheels or rollers disposed in contiguity to the driving rollers and means whereby these idler rollers may be locked from movement when the turn table is in a predetermined and locked position to permit the vehicle to be run on or run off, and thus provide a proper traction surface for the vehicle wheels enabling them to be run off the turn table. These idler rollers when freely rotating act to block the movement of the vehicle and thus hold it upon the turn table.

Another object is to provide an improved construction of turn table frame braced against all strains and to provide means whereby the various supporting wheels, driving rollers, gears, etc., may be properly oiled.

Other objects will appear in the course of the following description.

My invention is illustrated in the accompanying drawings, wherein:

Figure 1 is a plan view of a turn table constructed in accordance with my invention; Fig. 2 is a section on the line 2—2 of Fig. 1; Fig. 3 is a plan view of the turn table similar to Fig. 1 but showing the platform of the turn table removed and the walls of the pit within which the table rotates in section; Fig. 4 is a section on the line 4—4 of Fig. 1; Figs. 5, 6 and 7 are fragmentary plan views of the bolt latching mechanism showing the same in various positions; Fig. 8 is a fragmentary section of a portion of the turn table frame, the bolt latch being shown in elevation; Fig. 9 is a fragmentary perspective view of the bolt latch and one of its co-acting parts; Fig. 10 is a perspective view of the driving rollers, the gears connected thereto, the idler rollers, and the means for locking the idler rollers from movement.

Referring now particularly to Figs. 1, 2, 3 and 4, it may be said that my improved turn table is intended to be operated within a turn table pit designated generally at 2. This pit may have any desired form and is of course deep enough to accommodate the turn table so that the upper face of the table will be flush with the floor of the building within which the turn table is mounted. Preferably the walls of the pit are of concrete and preferably there is a central pier 3 for supporting the pivot post upon which the table rotates. Disposed upon the floor of the pit 2 is a circular track designated 4, which track is mounted upon a series of ties. These ties may be either embedded in the concrete bottom of the pit, or attached thereto in any suitable manner. The rails of the track 4 are so constructed that they incline centrally and upwardly, as illustrated in Figs. 2 and 4, so that the weight of the turn table is uniformly supported. I do not, of course, wish to be limited to any particular form of track for the turn table. The walls of the pit are also provided with locking lugs or keepers, as will be later described in connection with the turn table itself.

The turn table frame comprises a plurality of parallel main beams 5 spaced from each other by transverse beam members 6 and held by transversely extending bolts 7. Segmental members 9 are provided at opposite ends of the turn table and are attached to the main frame in a manner as will be hereinafter stated. Mounted upon the main frame is a floor support formed of transversely extending relatively light beams 10 and longitudinally extending connecting members 11. I do not wish, of course, to be limited to the precise construction of the supporting frame, as this may be modified in many ways.

Mounted upon the beams 8 at opposite ends of the turn table on the under side thereof are track wheels 12 which engage with the rail 4. It will be seen that these track wheels are arranged at an angle so as to be at all times approximately parallel to the rail 4. Also mounted upon the beams 8 are the traction wheels 13. There are two of these wheels 13, mounted one at each end of the machine, and extending transversely of the longitudinal axis of the turn table. Each of these traction wheels, as illustrated in Fig. 4, is formed with a tread surface 14 and a toothed face 15, this face being beveled. Also mounted at each end of the turn table is a vertically disposed driving shaft 16 carrying at its lower end a beveled gear 17, as shown in Fig. 4, which engages with the beveled gear 15. The driving shaft 16 carries upon its upper end a horizontally disposed beveled gear 18. Referring now to Figs. 3 and 4 it will be seen that extending across each end of the turn table and mounted in journal bearings upon the beams 5 are the horizontally disposed shafts designated 19. Each shaft carries upon it a beveled gear 20 which meshes with the beveled gear wheel 18, at the corresponding end of the turn table frame. There are, of course, two of the shafts 19, one at each end of the turn table frame, and each shaft meshes with its corresponding beveled gear wheel 18. Mounted at opposite ends of the shafts 19 are the rollers 21. These rollers are relatively wide and are adapted to receive and be engaged by the wheel of an automobile or like vehicle. Each shaft 19 is also provided with the opposed ratchet wheels 22 engaged by the pawls 23. These pawls permit the shafts 19 to rotate in one direction and prevent any rotation of the shafts in the opposite direction. The rollers 21 are mounted upon the shafts 19 in any suitable manner, but I have shown them as attached to the shafts by means of collars 24 having screws passing into the roller and each having a set screw engaging with the shaft.

Disposed parallel to each of the shafts 19 are the shafts 25. These shafts are freely rotatable in journaled bearings carried by the beams 5, and mounted upon these shafts 25 at each end thereof are the chocking rollers 26. These chocking rollers are attached to the shafts 25 in any suitable manner so as to rotate therewith. At each end of each roller 26 there is provided a spur wheel designated 27. Extending parallel to each shaft 25 are the rock shafts 28 disposed one on each side of the center of the turn table, and co-acting with the spur wheels 27 are a plurality of locking detents or plungers 29, one for each of the spur wheels 27 and operating through guides 30 bolted upon cross-pieces 31 connecting the beams 5. The plungers 29 are freely movable through the guides 30. The outer end of each plunger is formed with a toothed head 32, the teeth of which are adapted to intermesh with the teeth of the wheels 27, as illustrated clearly in Fig. 10. These plungers 29 constitute latches, and when the plungers are in interengagement with the spur wheels 27 they lock the idler rollers 26 from rotation, and lock the shafts 25 from rotation also. When, however, these plungers 29 are retracted the shaft and the rollers 26 are free to rotate. In order to operate these latching plungers 29, they are operatively connected with the rock shafts 28, as illustrated in Fig. 10, each rock shaft being provided with two pairs of radially projecting arms 33 connected by links 34 to the locking plungers. It will be seen from Fig. 10 that when the rock shaft is turned in a clock-wise direction the locking plungers will be forced into engagement with the teeth on the spur wheels 27, while when the shaft is turned in the reverse direction the locking pawls will be withdrawn therefrom.

It is my intention to provide means whereby the locking detents shall be operatively shifted out of mesh with the wheels 27 when an automobile or like vehicle passes upon the turn table, and I also provide means whereby these locking detents may be operated by hand, as where it is desired to allow the automobile to pass off of the turn table. To this end, each of the shafts 28 is provided with an arm 35. These arms extend toward each other and overlap at the center of the turn table. Disposed upon and forming one section of the flooring 36 of the turn table (see Fig. 1) is a transversely extending plate 37. This plate is yieldingly supported in a raised position and is of sufficient length that the front wheels of a vehicle driven upon the turn table will engage with the plate to depress the same. This plate is operatively connected, as will be later described, to the arms 35 so that when the plate is depressed against the force of a supporting spring, these arms will be depressed, thus rotating the rock shafts 28 and retracting the latching plungers 29. When the automobile passes off of the turn table, however, the plate 37 will be raised and the plungers 29 will again be shifted into their locked position. The plate 37 is formed with lateral guide wings 38 which fit down on each side of a central transverse bar 5ª. Springs 39 are disposed between the plate 37 and the upper edge of the bar 5ª so that after the pressure has been relieved upon the plate, the plate will be shifted to its up-raised position. Means are also provided for operating the rock shafts 28 by hand, this means being later described.

The turn table is rotatably mounted upon the pier 3. The pier 3 upon its face is formed with an upwardly projecting hub designated 40 (see Fig. 4) which projects up into a socket 41 formed in a transverse beam 6ª connected to the longitudinal beams 5. Ball bearings or antifriction bearings may be applied between the hub 40 and the socket engaging said hub if desired, such an application being obvious and needs no specific description.

The turn table is ordinarily locked from rotation by bolts disposed at diametrically opposite points on the table to engage with keepers 42. Each keeper is attached to a beam 43 embedded in the concrete wall of the turn table pit. Each keeper has a locking lug 44 formed with a beveled face and a straight face extending perpendicularly to the wall, and adjacent to the straight face of the lug the keeper is formed with an opening 45, or recess, as shown in Figs. 5, 6 and 7, adapted to receive the extremity of the bolt.

The bolts on opposite sides of the turn table are precisely of the same construction and operation, and hence a description of one bolt with its operating mechanism will apply to the other bolt. Each bolt is designated 46 and projects through the end wall of the supporting frame of the turn table, as shown in dotted lines in Fig. 3. Each bolt has a rearward extension designated 47 and having the form of an angle iron. One flange of the angle iron extends parallel to transverse beams 48 upon which the inner bearings for the shafts 19, 25 and 28 are mounted. The forward end of the bolt is rounded, as at 49, so as to ride over the inclined face of the keeper. Attached to the angle iron extension 47 of the bolt is a member 50 which is preferably formed of strap iron having inwardly bent ends to constitute shoulders and riveted, or otherwise attached, to the vertical flange of the angle iron 47. This member is therefore rectangular in form and constitutes one of the members of the locking device whereby the bolt is held in a semi-retracted or fully-retracted position. The normal position of the bolt and its parts is illustrated in Fig. 5.

The rear end of the bolt moves over a platform 51, and mounted upon this platform is a lever 52 having arms projecting in opposite directions, one of the arms normally projecting toward the forward end of the bolt, while the other arm projects rearward. These arms, as illustrated, are off-set with relation to each other. The rear end of the lever 52 is connected to a spring 53 whose other end is attached to any fixed point. The forward end of the lever 52 is engaged in a latch bolt 54 disposed at right angles to the line of movement of the bolt and sliding in a guide 55. A flange 56 extends upward parallel to the face of the member 50, and this flange is slotted for the passage of the latch bolt 54. The flange is also slotted, as at 57, for the passage of a pin 58 projecting from the vertical flange of the extension 47 and projecting through the face of the member 50. This pin on its inner end is reduced where it passes through the flange 56, and is provided with a nut or locking device 59. Carried upon the inner face of the flange 56 is a slide 60, illustrated in detail in Fig. 9, this slide being longitudinally slotted as at 61. The slide is provided with a forwardly extending wedge shaped extension 62, this extension being relatively flat but formed with upwardly projecting side walls 63. It will be seen that this wedge shaped extension is triangular in form, one side of the extension being in alinement with the inner face of the member 60, while the opposite side diverges. The bolt 54, as illustrated in Fig. 9, is cut-away at its forward end, as at 64, and the wedge-shaped extension 60 operates beneath the forward end of the bolt and in this cut-away portion, the sides 63 of the extension operating against the shoulder 65 forming one wall of the cutaway portion 64. It will thus be seen that as the member 60 is shifted rearward, that is, toward the center of the turn table, the flange 63 will crowd the latch bolt 54 outward and away from the member 50, as shown in Fig. 6. The reduced end of the pin 58 passes through the slot 61 in the member 60 so that after the bolt 46 has been retracted a certain distance, the member 60 will be acted upon and will be retracted in its turn and shift the latch bolt 64 rearward. Pivotally mounted upon the platform 51 adjacent to the plate 56ª upon which the lever 52 and the bolt 54 are mounted is a bell crank lever 66 which is pivoted at 67. One arm of the bell crank lever extends outward and projects behind the shoulder formed by the rear end of the member 50, while the other arm of the bell crank lever extends forward and engages behind the rear end of the lever 52, as illustrated in Fig. 5. This forwardly projecting arm of the lever 66 is formed with an upwardly turned extremity 68 which engages the rear arm of the lever 52. Thus, as the bolt 46 and its extension 47 are shifted rearward, the rear end of the lever 52 will engage with the laterally projecting arm of the lever 66 and turn it to the position shown in Fig. 6. The forwardly projecting arm will engage the rearwardly projecting arm of the lever 52 and move it outward, and thus retract the latch bolt as illustrated in Fig. 6.

Mounted upon the platform 51 and extending over the widest end of the wedge member 60 is a finger 67. This finger is resilient and bears down upon the upper face of the member 60 and frictionally engages the same so as to impede its movement. This friction finger 67 bears upon the wedge 60 with a force greater than the force of the spring 53, so that it will hold the latch bolt 54 in a retracted position against the force of this spring.

Attached to each of the shafts 28 and projecting therefrom are arms 69. Each arm has attached to it a connecting rod 70, as illustrated in Figs. 3 and 10, the connecting rod leading from the shaft 28 on one side of the turn table runs to the bolt operating mechanism on the opposite side of the turn table, and each arm is inwardly turned, as at 71, and passes through a slot in the beam 48 and engages and passes through a slot in the angle iron extension 47, as illustrated in Figs. 5, 6 and 7. It will thus be seen that upon compression of the plate 37, a second depression of the arms 35, and the rotation of the rock shafts, both of these connecting rods 70 will be retracted and that as they move rearward, the terminal ends 71 thereof will move through the slots 72 and eventually engage with the end wall of the slots 72. A further retraction of the connecting rod 70 will draw rearward upon the extension 47 of the bolt 46, thus drawing the bolt out of the opening 45 until the rounded end of the bolt is in such position that it may pass the face of the opening and move over the face of the keeper. This is the position shown in Fig. 5. When the bolt is moved rearward to the position shown in Fig. 5, the spring 53 will cause the lever 52 to project the latch 54 into engagement with the forward end of the member 50 thus locking the bolt 46 in a semi-retracted position, that is, a position sufficiently retracted to permit the turn table to rotate in the direction of the arrow Fig. 5.

The turn table is rotated through 180 degrees until the rounded end of the bolt comes in contact with the inclined or rounded face of the keeper succeeding 44 and rides up thereon. This pushes the bolt 46 and its extension 47 rearward beyond the position shown in Fig. 5 to the position shown in Fig. 6. The pin 58 in this position will engage the rear end of the slot 61 and draw the member 60 with its wedge rearward. At the same time, the rear end of the member 50 will engage the bell crank lever 66, as shown in Fig. 6, so as to withdraw the latch 54. At the same time that the latch is withdrawn, the wedge 60 is advanced into the cut-away portion of the latch to the position shown in Fig. 6, and acts as a lock holding the bolt in its retracted position against the force of the spring 73, and the wedge member in turn is frictionally held in position by the finger 67. The purpose of this action is to free the bolt so as to permit it to be projected and engaged with the opening 45, when the bolt has passed over the apex of the keeper. As the bolt passes over the edge of the lug of the keeper, it is projected outward by means of the spring 73, which, in the embodiment of my invention illustrated, has an angular form and is attached to one of the transversely extending beams 48. This spring has an upwardly projecting extension which projects into or projects through an opening in the horizontal flange of the extension 47. As soon as the bolt has passed the apex of the keeper 44 it will be projected by means of this spring outward to its full extent, and the parts will return to the position shown in Fig. 7, and the turn table be once more locked in place.

While I have illustrated the turn table as being locked at diametrically opposite points of the pit, it will be obvious that it may be locked at a number of points if so desired, and it is also obvious that the turn table may be stopped at any desired angle of rotation without the bolts being projected and by merely stopping the motive power of the machine.

It will be obvious that when a machine is driven upon the turn table the front wheels will first depress the plate 37 and that this movement will act to retract the bolt to the position shown in Fig. 5 and also act to thereby unlock the driving shaft 19. At the same time this movement will act to retract the pawls 29 from engagement with the spur wheels 27, thus rendering the loose rollers 26 free to rotate idly. As soon as this occurs, the driving wheels of the machine, engaging as they do with the rollers 21, will cause the shaft 19 to be rotated, thus rotating the shaft 16 and the driving wheels 13 and rotating the turn table under the power of the machine in the direction of the arrows shown in Figs. 5, 6 and 7. When the bolts 46 have been operated, as previously described, by the keepers 44 and the parts brought into position as shown in Fig. 7, the rock shafts will be turned in reverse directions thus throwing the pawls 29 into engagement with the spur wheels 27 and locking the rollers 26 and 21 from rotation.

This occurs when the turn table has turned through 180 degrees. As soon as this occurs, the driving wheels, engaging as they will with the rollers 26 which are then fixed, cause the machine to move off the turn table.

In order to provide means whereby the detents 29 may be thrown into engagement with the spur wheels 27 at any desired angle of rotation, I may provide hand levers 74 which extend up at both ends of the plate 37 and extend through slotted plates 75, as illustrated in Fig. 1. Each hand lever is connected to a rock shaft 76 which is provided with a radially projecting arm 37 connected by means of a link 78 to the arm 68 to which the connecting rod 70 is attached. Thus, by moving the hand levers the detents 29 may be retracted. This retraction, however, will not cause any shifting of the bolt operating mechanism for the reason that the connecting rod 70 passes through a slot 72 in the extension 47 of the bolt 46. I have illustrated two of these levers 74, one located at each end of the plate 37 so that the levers may be in convenient position for operation by the driver of a car. It is to be understood, however, that only one lever might be provided. Both of these levers are connected to the same shaft 76, and this shaft 76 is connected to both sets of detents 29.

It will be noted from Fig. 4 that the frame of the turn table is braced at its ends by means of segment beams 79 and cross beams 80 disposed between the transverse beams 48, and it is also to be noted that the cross beam 48 immediately adjacent to the side of each bolt 46 is further braced by a bracing member 81 which strengthens the structure against the jar and shock incident to the bolt striking the wall of the opening 45. It will be understood, of course, that the deck beams 10 are braced in any suitable way, and as illustrated, are supported by transverse beams 82, which are in turn supported from the lower ends of the beams 48 by angular braces 83. I do not wish, however, to be limited to the particular construction of the supporting frame of the turn table, as it may be formed in any suitable manner.

In order to provide means for oiling the bearings of the various wheels, gears, etc., of the turn table I provide oil openings 84 and 85, disposed upon the face of the turn table and each one leading to one of the bearings. In order to oil the bearings of the track engaging wheels, I have provided the ducts 86 which lead down from the openings 85 and extend to these lower bearings.

The operation of my device will be understood from what has gone before. To recapitulate the movement it may be said that the table is normally in the position shown in Fig. 1. A car is driven upon the turn table from either direction, and as its forward wheels engage the plate 37 the plate is depressed. This immediately retracts the bolts to the position shown in Fig. 5, and at the same time releases the detents 29 from engagement with the spur wheels 27. The rotation of the driving wheels of the car operating upon the rollers 21 will cause the turn table to be driven, and this driving movement will continue until such time as the bolts move upward over the keepers and then are projected into the openings 48. As soon as this occurs the detents 29 will be thrown again into engagement with the spur wheels, thus locking the rollers 36, and the car may move off the turn table with its own power. It will be noted in this connection that there is no necessity of stopping the car and further that the action of the turn table is entirely automatic and requires no attention from the driver. If, however, it is desired to stop the turn table and permit the car to run off at a point intermediate of the position of the keepers, then the levers are operated which act to manually shift the detents 29 out of their engagement with the spur wheels 27, whereby the car may be run off under its own power.

My invention is particularly useful in garages, though it may be used in other establishments. It permits cars to be readily turned and run off to any desired position within the garage, and further it permits the turn table construction to be heavier than would be otherwise possible where the turn table is to be operated by hand. Operation by hand is either very slow, as where gears are used, or else the power required is relatively great. By my construction the machine itself supplies the power for operating the turn table, and as the driving wheels are rotating relatively rapidly, the movement of the turn table is relatively rapid, or as rapid as may be desired, depending upon the speed used on the car.

It will be noted from Fig. 1 that the gear wheels 27 and the ratchet teeth 22 on each of the rollers 26 and 21 are covered by plates 87 so that dust and dirt will not collect between the teeth of these gears and impede their action. At the same time these plates may be readily removed so as to permit the gears to be inspected, cleaned or repaired.

It will be noted that the rollers 21 are held from rotation at the time that a car is driven upon the turn table by reason of the fact that the bolts 46 are in engagement with the keepers 42. As these bolts prevent the rotation of the turn table, and as this in turn prevents any rotation of the driving wheels 13, it is obvious that no rotation of the shaft 19 can occur until the bolts are unlocked. The rollers 26, of course, are held from rotation by the detents 29 and thus when a car is driven upon the turn table or driven off the turn table, the driving wheels will engage with the rollers 26 and 21, which are then fixed, and give a proper traction bearing for the wheels. As soon, however, as the car has entered upon the turn table and depressed the plate 37, the shaft 25 is disengaged so as to permit the rollers 26 to rotate, and, inasmuch as the turn table is freely revolved, the rollers 21 are then freely rotated with the shaft 19, and both the rollers 21 and 26 to this extent are idler rollers, the rollers 21, however, constituting the driving rollers whereby power is transmitted to the driving wheels 13. The rollers 26 constitute chocking rollers, the forward and rear wheels of the machine resting between the rollers 26 and 21.

It might be possible to dispense with the rollers 26 under certain circumstances so as to allow the wheels to bear upon the rollers 21 alone. The rollers 26, however, form a traction surface with which the driving wheels of the machine engage when the machine is being driven off of the turn table, and likewise give a better support to the wheels of the machine than would be afforded merely by using the rollers 21.

Having thus described my invention, what I claim as new is:

1. The combination with a turntable, of means operative by the wheels of a motor driven vehicle to cause the rotation of the turntable, means for locking the turntable from rotation, and means operative by the weight of the vehicle for releasing said locking means.

2. The combination with a turntable and a pit within which the turntable rotates, of means operative by the wheels of a motor driven vehicle to cause a rotation of the turntable, locking means engaging the turntable with the pit to prevent its rotation, locking means engaging said wheel operated means to prevent a rotation thereof, and means operated by the weight of the vehicle for unlocking both of said locking means.

3. The combination with a turntable, of rotatable driving members mounted on the turntable and operative by engagement with the wheels of a motor driven vehicle to cause a rotation of the turntable, rotatable chocking members disposed parallel to the first named rotatable members, means for locking said chocking members from rotation to thereby prevent a rotation of the driving means, and means actuated by the weight of the vehicle for unlocking said chocking means to thereby permit a rotation of the turntable and of the driving means.

4. The combination with a turntable, of rotatable driving means disposed on the turntable and operative by engagement with the wheels of a motor driven vehicle to cause the rotation of the turntable, rotatable chocking means mounted parallel to said driving means, means for locking said chocking means, means for locking the turntable from rotation, and means operated by the weight of the vehicle for releasing both of said locking means to thereby release the rotatable driving means and permit it to be operated.

5. A turn table for power driven vehicles including a rotatable platform, rotatable members mounted upon said platform, a driving wheel carried by the platform, gearing operatively engaging the rotatable members with the driving wheel whereby the latter may be rotated from the frame, freely rotatable members disposed parallel to the first-named rotatable members and adjacent thereto, and means for preventing or permitting the free rotation of said members.

6. A turn table for power driven vehicles including a rotatable platform, a driving wheel carried by the platform, rotatable driving members mounted upon the platform and operatively connected with the driving wheel, said members being spaced from each other and so disposed as to be engaged by the driving wheels of a vehicle, parallel rotatable members disposed adjacent to the first-named rotatable members, means automatically locking the last-named rotatable members from operation, and means for automatically unlocking said last-named rotatable members to permit their free rotation when a vehicle is driven upon the platform.

7. A turn table for power driven vehicles including a rotatable platform, a driving wheel carried by the platform, spaced rotatable members operatively connected with the driving wheel, said members being disposed upon the face of the platform in position to be engaged by the driving wheels of a vehicle, rotatable chocking rollers also mounted upon the platform adjacent to and parallel with the rotatable members, and means for locking the chocking rollers from movement or releasing the chocking rollers.

8. A turn table for power driven vehicles including a rotatable platform, a driving wheel supported by the platform, a driving roller mounted upon the face of the platform in position to be engaged by a driving wheel of a vehicle, said roller being operatively connected to the first-named driving wheel, a chocking roller mounted adjacent to and parallel with the first-named roller, and detachable locking means for releasing the chocking roller from movement.

9. A turn table for power driven vehicles including a rotatable platform, a shaft carried upon the platform, rollers mounted upon the shaft and disposed upon the face of the platform, means operatively connected to the shaft whereby the turn table may be rotated upon the rotation of the shaft, chocking rollers supported in parallel relation to the first-named rollers and adjacent thereto, detents normally holding the said chocking rollers from rotation, and means operative by the arrival of a vehicle upon the turn table for automatically releasing said detents.

10. A turn table for power driven vehicles including a rotatable platform, a shaft carried upon the platform, rollers mounted upon the shaft and disposed upon the face of the platform, means operatively connected to the shaft whereby the turn table may be rotated upon the rotation of the shaft, chocking rollers supported in parallel relation to the first-named rollers and adjacent thereto, detents normally holding the said chocking rollers from rotation, and means for automatically projecting said detents into engagement with the chocking rollers when the turn table has rotated to a predetermined position.

11. A turn table for power driven vehicles including a turn table pit, a platform rotatable within the pit, means normally locking the platform from rotation within the pit, means operated by the arrival of a vehicle upon the platform for disengaging said platform locking means, and rotatable driving members operated by and engaging with the driving wheels of the vehicle for rotating said platform.

12. A turn table for power driven vehicles including a turn table pit, a rotatable platform mounted in the pit, means normally locking said platform from rotation, means operated by the arrival of a vehicle upon the platform for releasing said platform locking means, rotatable members operated by and engaging with the driving wheels of the vehicle for rotating said platform, and means automatically locking the platform from further rotation after the platform has rotated through a certain predetermined angular distance.

13. A turn table for power driven vehicles including a turn table pit, a rotatable platform mounted therein, means normally locking the platform from rotation, means operated by the arrival of a vehicle upon the platform for releasing said locking means, means operated by the driving wheels of the vehicle for rotating the platform, means automatically locking the platform after the platform has rotated to a predetermined distance, and hand operated means for operatively disengaging the engagement of the driving wheels of the vehicle from the driving means.

14. A turn table for power driven vehicles including a turn table pit, a platform rotatably mounted in the pit, means normally locking the platform from rotation, means actuated by the arrival of a vehicle upon the platform for disengaging said locking means, a driving wheel carried by the platform, and driving shaft adapted to be engaged by the driving wheels of a vehicle when it arrives upon the platform whereby the platform may be rotated by the power of the vehicle, freely rotating chocking rollers disposed adjacent to said shaft and also engaged by the wheels of the vehicle, means for locking the said chocking rollers from rotation, means operated by the arrival of the vehicle upon the platform for releasing said locking means to permit power to be applied to the driving shaft, and means for automatically locking the platform after it has rotated through a certain angular distance, said means simultaneously locking the chocking rollers from rotation.

15. A turn table for power driven vehicles including a turn table pit, bolt keepers mounted at separate points in the walls of the pit, bolts carried by the platform and engageable with said keepers, said bolts being normally projected, means operated by the arrival of a vehicle upon the platform for retracting said bolts to release the turn table, driving rollers mounted upon the face of the platform and engageable by the driving wheels of the vehicle, means operatively connected to said driving rollers for rotating the platform, chocking rollers mounted adjacent to the driving rollers and parallel thereto, means normally locking said chocking rollers from rotation, means operated by the arrival of a vehicle upon the platform for unlocking the said chocking rollers and simultaneously retracting said bolts, and means for automatically projecting the bolts and locking said chocking rollers when the turn table is rotated through a predetermined angular distance.

16. A turn table for power driven vehicles including a turn table pit, bolt keepers mounted at separate points in the walls of the pit, bolts carried by the platform and engageable with said keepers, said bolts being normally projected, means operated by the arrival of a vehicle upon the platform for retracting said bolts to release the turn table, driving rollers mounted upon the face of the platform and engageable by the driving wheels of the vehicle, means operatively connected to said driving rollers for rotating the platform, chocking rollers mounted adjacent to the driving rollers and parallel thereto, means normally locking said chocking rollers from rotation, means operated by the arrival of a vehicle upon the platform for unlocking said chocking rollers and simultaneously retracting said bolts, means for automatically projecting the bolts and locking said chocking rollers when the turn table is rotated through a predetermined angular distance, and manually operable means for locking said chocking rollers at any desired position of the turn table.

17. A turn table including a turn table pit, a circular track mounted in the pit, a framework rotatably mounted within the pit, a platform mounted upon the framework, oppositely disposed driving wheels engaging said track, oppositely disposed driving shafts mounted upon the platform, means operatively engaging said shafts each with its respective driving wheel, rollers mounted upon the shafts and adapted to be engaged by the driving wheels of a vehicle, chocking rollers disposed one adjacent to and parallel with each of the driving rollers, means normally holding said chocking rollers from free rotation, means for normally holding the driving shafts from rotation, means normally holding the chocking rollers from rotation, means operated by the arrival of a car upon the platform for releasing said driving shaft and the chocking rollers whereby the driving shaft may be operated from the driving wheels of a vehicle, and means locking the driving shaft from rotation and again locking the chocking rollers from rotation after the platform has rotated through a predetermined angular distance.

18. A turn table for power driven vehicles including a turn table pit, a platform rotatably mounted therein, means operable by the driving wheels of the vehicle and carried by the platform for rotating the platform, means locking said driving means from rotation, and means operable by the arrival of a vehicle upon the platform for disengaging said locking means and permitting the operation of the driving means by the driving wheels of the vehicle.

19. A turn table for power driven vehicles including a pit, a platform rotatably mounted in the pit, driving means carried by the platform and adapted to have operable engagement with the driving wheels of a vehicle, means holding said driving means from operation, means for releasing said holding means upon the arrival of a vehicle upon the platform, and means for again locking the driving means from operation when the turn table has moved through a predetermined angular distance.

20. A turn table for power driven vehicles including a turn table pit, a rotatable platform mounted therein, tracks within the pit, wheels carried by the platform and engaging said tracks and including driving wheels, a driving shaft mounted upon the platform and having oppositely disposed rollers, said driving shaft being operatively connected with the driving wheels of the platform, the rollers being so disposed as to be engaged by the driving wheels of a vehicle when driven upon the platform, chocking rollers disposed adjacent to and parallel with the driving rollers, means normally holding said driving rollers from operation when the turn table is in a predetermined position, means locking the chocking rollers from rotation, means operable by the arrival of a vehicle upon the turn table releasing the locking means of both the chocking rollers and the driving rollers whereby to permit the driving rollers to be operated by the driving wheels of the vehicle to rotate the platform, and automatically operating means for again locking the driving rollers and the chocking rollers from rotation after the platform has rotated to a predetermined angular distance.

21. A turn table for power driven vehicles including a turn table pit, keepers disposed around the pit, a track disposed upon the bottom of the pit, a platform rotatably mounted within the pit, wheels carried by the platform and engaging said track, certain of the wheels being driving wheels, oppositely disposed parallel shafts being disposed upon the platform, rollers carried upon opposite ends of the shafts and adapted to be engaged by driving wheels of a vehicle upon a vehicle being driven upon the platform, means normally locking the platform from rotation and the driving rollers and shafts from rotation, means normally locking the chocking rollers from rotation, means operable automatically by the arrival of a vehicle upon the platform for releasing said platform, holding means, the driving rollers and the chocking rollers.

22. A turn table for power driven vehicles including a turn table pit having oppositely disposed keepers, a track mounted upon the bottom of the pit, a platform rotatably mounted within the pit, and having supporting wheels engaging said track, certain of the wheels being driving wheels, parallel driving shafts disposed one at each end of the platform, a pair of rollers carried by each shaft, said rollers being spaced from each other and positioned to engage the driving wheels of a vehicle, means operatively engaging the driving shaft with the driving wheels of the platform, normally projected bolts engaging said keepers and carried by the platform, said bolts preventing the rotation of the platform and thereby preventing the rotation of the driving wheels and driving rollers, chocking rollers disposed in parallel relation to and adjacent the driving rollers, detents normally holding the chocking rollers from rotation, means operated by the weight of the vehicle upon the platform for retracting said bolts and retracting said chocking roller detents whereby to permit the rotation of the platform under the power of the vehicle, and means for releasing the bolts and reëngaging the detents with the chocking rollers when the turn table is rotated through a predetermined angular distance.

23. A turn table including a circular track, a platform rotatably mounted upon the track, driving wheels carried by the platform and engaging the track, said driving wheels having beveled toothed faces, vertical shafts carried by the platform, each shaft having a beveled gear engaging the beveled toothed face of the driving wheels, a horizontally disposed shaft mounted upon the platform, a beveled gear carried on the upper end of the vertical shaft, a beveled gear on the driving shaft engaging therewith, and rollers fixedly mounted on the driving shaft and spaced from each other and disposed upon the platform so as to be engaged by the driving wheels of a power driven vehicle.

24. A turn table for power driven vehicles including a circular track, a platform, supporting wheels carried by the platform and operating on the track, driving wheels also carried by the platform and engaging said track, vertical shafts each operatively connected with one of the driving wheels, beveled gear wheels carried by the upper ends of said shafts, oppositely disposed parallel horizontally arranged driving shafts carried upon said platform, beveled gear wheels on each shaft engaging the beveled gear wheels on the upper ends of the vertical shafts, a pair of oppositely disposed rollers carried on each of the horizontal driving shafts and spaced from each other to permit of their engagement by the wheels of a power driven vehicle, ratchet wheels also carried by said driving shafts, and pawls engaging said ratchet wheels to prevent their rotation in one direction.

25. In a turn table for power driven vehicles, a circular track, a rotatable platform, wheels carried by the platform and engaging with said track and including driving wheels, oppositely disposed horizontal shafts mounted upon said platform and operatively connected to said driving wheels, rollers mounted upon the shafts and spaced from each other a distance equal to the width of a car to be accommodated by the platform, oppositely disposed shafts extending parallel to the said driving shafts, rollers mounted upon said shafts and parallel to the first-named rollers, spur gears carried by the shafts, detents normally projecting into the spur wheels to prevent the rotation of said rollers, parallel rock shafts having radially arranged arms, and the rock shafts operatively engaging said detents, a vertically yielding plate disposed at the middle of the platform and having a length equal to the wheel base of the vehicle, and arms on each rock shaft projecting beneath the plate and adapted to be depressed by a depression of the plate to cause a rotation of the rock shaft to withdraw the detents from their engagement with the spur gears.

26. A turn table for power driven vehicles including a pit having oppositely disposed keepers, carried on the wall thereof, a circular track at the bottom of the pit, a rotatable platform having wheels engaging said track, driving wheels carried by the platform and engaging with said track, horizontally arranged driving shafts mounted upon the platform and each operatively engaging with one of said driving wheels, each shaft being adapted to be engaged by the driving wheels of a vehicle on the platform to rotate the platform, chocking rollers disposed parallel to said shaft, means holding said chocking rollers from operation a spring actuated bolt carried by the platform and adapted to engage said keepers and hold the platform from rotation, a depressible member actuated by the weight of the vehicle upon the platform and when depressed withdrawing the locking means from the chocking rollers and acting to retract said bolt, a latch operatively engaging the bolt in a partially retracted position and operatively engaging the bolt when partially retracted to hold it in its retracted position to permit the rotation of the platform, and means operative by the engagement of the partially retracted bolt with a second keeper releasing said latch and permitting the bolt to be projected into locking engagement with the keeper.

27. A turn table for vehicles including a pit, spaced keepers mounted upon the walls of the pit and each including a lug having a beveled face and a straight face, the keeper being perforated at the base of the lug, a platform rotatably mounted in the pit, a spring actuated bolt normally projecting into the opening in the keeper and holding the platform from rotation, means actuated by the arrival of a vehicle upon the platform for retracting said bolt from said opening to thereby permit the platform to be rotated in a direction opposite to the inclined face of the keeper, means for holding said bolt in its partially retracted position, and means actuated by the engagement of the bolt with the inclined face of the lug on the next succeeding keeper for releasing said holding means and permitting the latch to be projected into engagement with the opening of said last-named keeper.

28. A turn table for power driven vehicles including a pit, keepers mounted at spaced intervals on the walls of the pit, each keeper including a perforated plate having a lug projecting from the plate adjacent to the perforation, one face of the lug being perpendicular to the keeper and the other face being inclined, a platform rotatably mounted in the pit, a spring actuated bolt slidingly supported at one end of the platform and adapted to engage in the perforations of the keepers, the bolt having an inwardly projecting extension, a laterally projecting member carried by the extension and formed with oppositely disposed shoulders, a spring actuated latch projecting into engagement with the forward shoulder of each extension, a lever operatively connected to the latch and having an arm projecting beyond the rearmost shoulder of each extension and arranged to retract the latch upon a rearward movement of the bolt and its extension, a wedge moving with the extension but movable independently thereof and operatively engaged with the extension to shift into engagement with the latch to hold it open as the bolt and extension are moved rearward, a depressible member mounted at the center of the platform, and means operatively engaging the depressible member and said bolt to retract the latter on a downward movement of said depressible member to a position out of engagement with the perforation in the keeper to permit the latch to engage the shoulder on the extension and hold the bolt in its partially retracted position, the said wedge being operated by a further retraction of the bolt upon its engagement with the inclined face of the lug on the opposite keeper to thereby release the bolt and permit its projection into engagement with the perforation on the last-named keeper.

In testimony whereof I affix my signature in presence of two witnesses.

ROBERT EWING HALL. [L. S.]

Witnesses:
  LOUVIA DAVIS,
  J. F. YATES.